(12) United States Patent
Andersen et al.

(10) Patent No.: US 11,261,995 B2
(45) Date of Patent: *Mar. 1, 2022

(54) MULTIPLE VALVE CONTROL ASSEMBLY

(71) Applicant: CAIRN5 LLC, Fayetteville, AR (US)

(72) Inventors: Trent Andersen, Fayetteville, AR (US); Kurt Kutz, Fayetteville, AR (US)

(73) Assignee: CAIRN5 LLC, Fayetteville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/017,727

(22) Filed: Jun. 25, 2018

(65) Prior Publication Data

US 2018/0306344 A1 Oct. 25, 2018

Related U.S. Application Data

(63) Continuation of application No. 15/392,628, filed on Dec. 28, 2016, now Pat. No. 10,006,563.

(60) Provisional application No. 62/271,909, filed on Dec. 28, 2015.

(51) Int. Cl.
*F16K 35/14* (2006.01)
*F16K 5/06* (2006.01)
*F16K 31/524* (2006.01)
*F16K 31/60* (2006.01)
*F16K 35/06* (2006.01)

(52) U.S. Cl.
CPC ............ *F16K 35/14* (2013.01); *F16K 31/524* (2013.01); *F16K 31/602* (2013.01); *F16K 35/06* (2013.01); *Y10T 137/87973* (2015.04)

(58) Field of Classification Search
CPC ...... F16K 35/14; F16K 35/524; F16K 15/202; F16K 5/0647; F16K 31/524; F16K 31/602; Y10T 137/87973
USPC .................................. 137/614.06; 251/149.9
See application file for complete search history.

(56) References Cited

U.S. PATENT DOCUMENTS

| | | | | |
|---|---|---|---|---|
| 4,359,066 A * | 11/1982 | Hunt | ....................... | F16L 37/36 137/614.06 |
| 4,385,641 A * | 5/1983 | Albertin et al. | ........ | F16K 11/16 137/636.1 |
| 5,615,707 A * | 4/1997 | Pfannenschmidt | ..... | F16K 35/14 137/614.05 |
| 6,298,876 B1 * | 10/2001 | Bogdonoff et al. | .... | F16L 37/18 137/614.04 |
| 7,185,877 B2 * | 3/2007 | Budde | ..................... | F16K 35/02 137/614.06 |
| 9,097,622 B2 * | 8/2015 | Gotch | ................... | F16K 27/065 |
| 10,006,563 B1 * | 6/2018 | Andersen et al. | ...... | F16K 35/06 |
| 2014/0261778 A1 * | 9/2014 | Hamilton | ................ | F16K 17/00 137/461 |

* cited by examiner

*Primary Examiner* — Kevin L Lee
(74) *Attorney, Agent, or Firm* — Polsinelli PC (57) ABSTRACT

A multiple valve control assembly is described. The multiple valve control assembly includes a first cam/lever assembly to close a first valve, and a second cam/lever assembly to close a second valve. A first locking surface of the first cam/lever assembly, when the first cam/lever assembly is in the open position, physically blocks the rotation of the second cam/lever assembly. This provides for a pressure line to be closed by the first cam/lever assembly before the tank line can be closed by the second cam/lever assembly.

19 Claims, 8 Drawing Sheets

MULTIPLE VALVE CONTROL ASSEMBLY

This application is a continuation of U.S. Nonprovisional patent application Ser. No. 15/392,628 filed Dec. 28, 2016, now U.S. Pat. No. 10,006,563, which claims the benefit of U.S. Provisional Patent Application No. 62/271,909 filed Dec. 28, 2015, which are all hereby incorporated by reference.

FIELD OF INVENTION

The present invention relates to a multiple valve control assembly.

SUMMARY

A multiple valve control assembly is described. The multiple valve control assembly includes a first cam/lever assembly to close a first valve, and a second cam/lever assembly to close a second valve. The first valve may control a pressure line and the second valve may control a tank line. The first cam/lever assembly has a peripheral surface that engages with a peripheral surface of the second cam/lever assembly that requires that the first cam/lever assembly be turned before the second cam/lever assembly can be turned. The first cam/lever assembly must be closed first before the second cam/lever assembly may be closed. This provides for the pressure line to be closed by the first valve before the tank line can be closed by the second valve. This reduces pressure spikes on hydraulic seals, which reduces premature failure. This also locks out pressure and flow of the hydraulic fluid while an operator is working on an application or other system using the hydraulic fluid. The multiple valve control assembly may be used with all types of hydraulic applications, such as, for example, hydraulic motors, hydraulic cylinders, rotary actuators, etc.

In one aspect, a multiple valve control assembly is described. The multiple valve control assembly includes a first valve including a first entry port, a first exit port, and, a first valve stem engaged to a first valve member to open and close the first valve. The multiple valve control assembly includes a second valve including a second entry port, a second exit port, and a second valve stem engaged to a second valve member to open and close the second valve. The multiple valve control assembly includes a first cam including a first lever, and the first cam is engaged to the first valve stem to open and close the first valve. The first cam includes a first peripheral surface having a first locking surface and a first concave surface. The multiple valve control assembly includes a second cam including a second lever, and the second cam is engaged to the second valve stem to open and close the second valve. The second cam includes a second peripheral surface having a second locking surface and a second concave surface. The first cam is configured to rotate between an open position and a closed position. The second cam is configured to rotate between an open position and a closed position. The first locking surface of the first cam, in the open position, prevents the rotation of the second cam.

In another aspect, a multiple valve control assembly for a hydraulic system is described. The multiple valve control assembly includes a support member, a first valve in a pressure line, and a second valve in a tank line. A first cam is rotatably engaged to the support member. The first cam is engaged to the first valve to open and close the first valve. The first cam includes a first peripheral surface having a first locking surface and a first concave surface. A second cam is rotatably engaged to the support member. The second cam is engaged to the second valve to open and close the second valve. The second cam includes a second peripheral surface having a second locking surface and a second concave surface. The first cam is configured to rotate between an open position and a closed position. The second cam is configured to rotate between an open position and a closed position. The first locking surface of the first cam, in the open position, prevents the rotation of the second cam, and, when the first cam is in the closed position, the first concave surface receives the second locking surface of the second cam.

In another aspect, a valve control assembly is described. The valve control assembly includes a valve and a cam. The cam includes a lever. The cam is engaged to the valve to open and close the valve. The cam includes a peripheral surface having a locking surface and a concave surface. The valve and cam are engaged to a support member. A lock is rotatably engaged to the support member. The lock rotates between locked and unlocked positions. The lock includes a convex surface that extends into the concave surface of the cam in the locked position.

DETAILED DESCRIPTION OF INVENTION

A multiple valve control assembly 10 is described with reference to FIGS. 1-12. The multiple valve control assembly 10 includes a first cam/lever assembly 100 to close a first valve 30, and a second cam/lever assembly 200 to close a second valve 40. The first valve 30 controls a pressure line 70 and the second valve 40 controls a tank line 80. As described below, the first cam/lever assembly 100 must be rotated to the closed position before the second cam/lever assembly 200 can be rotated to the closed position. This provides for the pressure line 70 to be closed by the first valve 30 before the tank line 80 can be closed. This locks out pressure and flow of the hydraulic fluid while working on an application or other system using the hydraulic fluid. The multiple valve control assembly 10 may be used with any of a variety of piping, tubing, and other plumbing lines. The multiple valve control assembly 10 may be used with all types of fluids.

The first cam/lever assembly 100 includes a first cam 105 and a first lever 170. The second cam/lever assembly 200 includes a second cam 205 and a second lever 270. The levers 170 and 270 are fixedly connected to the cams 105 and 205. An operator may grip the first and second levers 170 and 270 to turn the first cam 105 and the second cam 205, respectively. The first cam/lever assembly 100 and the second cam/lever assembly 200 are installed on a support member 20. The first cam/lever assembly 100 and the second cam/lever assembly 200 rotate relative to the support member 20. The first valve 30 and the second valve 40 may be installed on a rear of the support member 20. The first cam 105 has a peripheral surface that engages with a peripheral surface of the second cam 205 that requires that the first cam 105 to be turned before the second cam 205 can be turned.

The first valve 30 includes a first entry port 32, a first exit port 34, and, a first valve stem 36 engaged to a first valve member 38 to open and close the first valve 30. The first valve 30 controls the flow of fluid in the pressure line 70 from the tank to the hydraulic application. The second valve 40 includes a second entry port 42, second exit port 44, and, a second valve stem 46 engaged to a second valve member 48 to open and close the second valve 40. The second valve 40 controls the flow of the fluid in the tank line 80 from the application back to the tank. The pressure line 70 includes a supply portion 72 from the tank and a supply portion 74 to the application. The tank line 80 includes a return portion 82 from the application and a return portion 84 to the tank.

The first cam/lever assembly 100 includes the first lever 170 for turning the first cam 105. The first cam 105 is engaged to the first valve stem 36 to open and close the first valve 30. The first cam 105 includes a first peripheral surface 110 having a first locking surface 115, a first convex segment 120, and a first concave surface 130.

The second cam/lever assembly 200 includes the second lever 270 for turning the second cam 205. The second cam 205 is engaged to the second valve stem 46 to open and close the second valve 40. The second cam 205 includes a second peripheral surface 210 having a second locking surface 215, a second convex segment 220, and a second concave surface 230. The first cam 105 is installed on the support member 20 immediately adjacent to the second cam 205. This provides for the first cam 105 and the second cam 205 to interact with each other as described herein. The first cam 105 and the second cam 205 may rotate to lock and unlock with each other.

The first cam/lever assembly 100 and the second cam/lever assembly 200 rotate over a surface 24 of the support member 20. Rear surfaces of the first cam 105 and the second cam 205 may be flush or adjacent to the surface 24. The first valve stem 36 and the second valve stem 46 may pass through the support member 20. As such, the first cam/lever assembly 100 and the second cam/lever assembly 200 may be positioned on laterally opposite sides of the support member 20.

In operation, the first cam 105 is configured to rotate between an open position and a closed position, and the second cam 205 is configured to rotate between an open position and a closed position. The second cam 205 may rotate to the closed position after the first cam 105 has rotated to its closed position. When the first cam 105 is in the open position, the first locking surface 115 of the first cam 105 physically prevents the rotation of the second cam 205. When the first cam 105 is in the closed position, the first locking surface 115 of the first cam 105 has been moved, and the first cam 105 no longer prevents the rotation of the second cam 205. When the first cam 105 is in the closed position, the first concave surface 130 of the first cam 105 is positioned to receive the locking surface 215 of the second cam 205, i.e., the second cam 205 may rotate and position the second locking surface 215 of the second cam 205 in the first concave surface 130 of the first cam 105.

Figure 1:
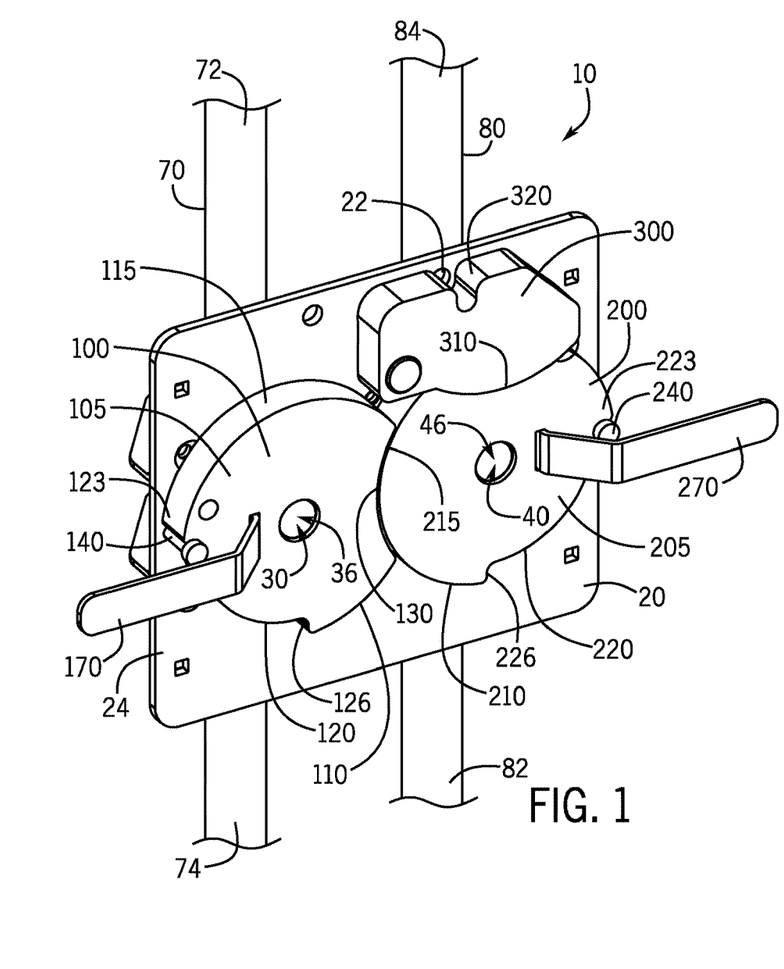
FIG. 1 is a perspective view of the multiple valve control assembly with both the first and second valves closed.
Figure 2:
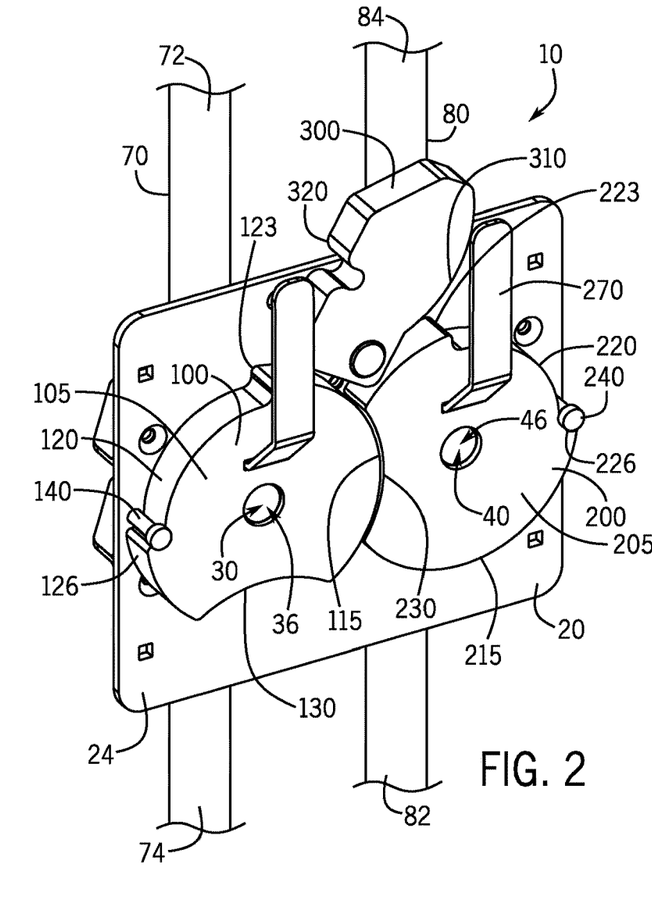
FIG. 2 is a perspective view of the multiple valve control assembly with both the first and second valves open.

The first cam 105 and the second cam 205 include a generally circular shape with their outer perimeters in close proximity. The first concave surface 130 and the second concave surface 230 are formed as curved, concaved portions into the outer perimeters of the first cam 105 and the second cam 205. The second concave surface 230 is shaped to receive the first locking surface 115, which is formed from an arc of the outer perimeter of the first cam 105. When closed, as shown in FIG. 1, the first concave surface 130 is generally filled by the second locking surface 215. When opened, as shown in FIG. 2, the second concave surface 230 is generally filled by the first locking surface 115.

The first concave surface 130 and the second concave surface 230 include concave portions extending into the outer perimeters of the first cam 105 and the second cam 205. For example, the first concave surface 130 may encompasses approximately 60 degrees to approximately 80 degrees of the total circular shape of the first cam 105, while the second concave surface 230 of the second cam 205 may encompass approximately 60 degrees to approximately 80 degrees of the total circular shape of the second cam 205. In the aspect shown in the figures, with reference to the closed positions shown in FIG. 2, the first concave surface 130 encompasses approximately 72 degrees of the total circular shape of the first cam 105, while the second concave surface 230 of the second cam 205 encompasses approximately 72 degrees of the total circular shape of the second cam 205. With reference to the closed positions shown in FIG. 2, where the levers 170 and 270 are at 0 degrees, the first concave surface 130 starts at approximately 144 degrees and ends at approximately 216 degrees with respect to the generally circular shape of the first cam 105, and the second concave surface 230 starts at approximately 234 degrees and ends at approximately 306 degrees with respect to the generally circular shape of the second cam 205. In this aspect, the first cam/lever assembly 100 turns 90 degrees counter-clockwise to close and the second cam/lever assembly 200 turns 90 degrees clockwise to close. In other aspects, the turning directions may be reversed.

A first limit 140 extends from the surface 24 of the support member 20. The first limit 140 is adjacent to the first convex segment 120. The first convex segment 120 includes a first end 123 and a second end 126. The first cam 105 is configured to rotate until either the first end 123 or the second end 126 contacts the first limit 140. A second limit 240 extends from the surface 24 of the support member 20. The second limit 240 is adjacent to the second convex segment 220. The second convex segment 220 includes a first end 223 and a second end 226, and the second cam 205 is configured to rotate until either the first end 223 or the second end 226 contacts the second limit 240. The first and second limits 140, 240 may limit the rotation of the first and second cams 105, 205 to prevent the over-rotation of the valve members 38, 48. The first and second limits 140, 240 may be moved to different positions on the surface 24 adjacent to the convex segments 120 and 220 to accommodate different turning ranges of the cams 105 and 205.

A lock 300 rotates between locked and unlocked positions. The lock 300 may be pivotally or rotatably attached to the support member 20. The lock 300 includes a convex surface 310 that extends into the second concave surface 230 of the second cam 205. The lock 300 includes a lock indent 320, and the support member 20 includes a lock opening 22, and a secondary lock, such as pad-lock (not shown) passes through the lock indent 320 and the lock opening 22 to prevent the rotation of the second cam 205. The secondary lock prevents the lock 300 from rotating to the unlocked position. The lock 300 may lock both the first cam 105 and the second cam 205 in the closed position. As shown in FIG. 1, the lock 300 prevents the cam 205 from rotating. With the second locking surface 215 of the second cam 205 in the first concave surface 130 of the first cam 105, the first cam 105 is also prevented from rotating.

Figure 3:
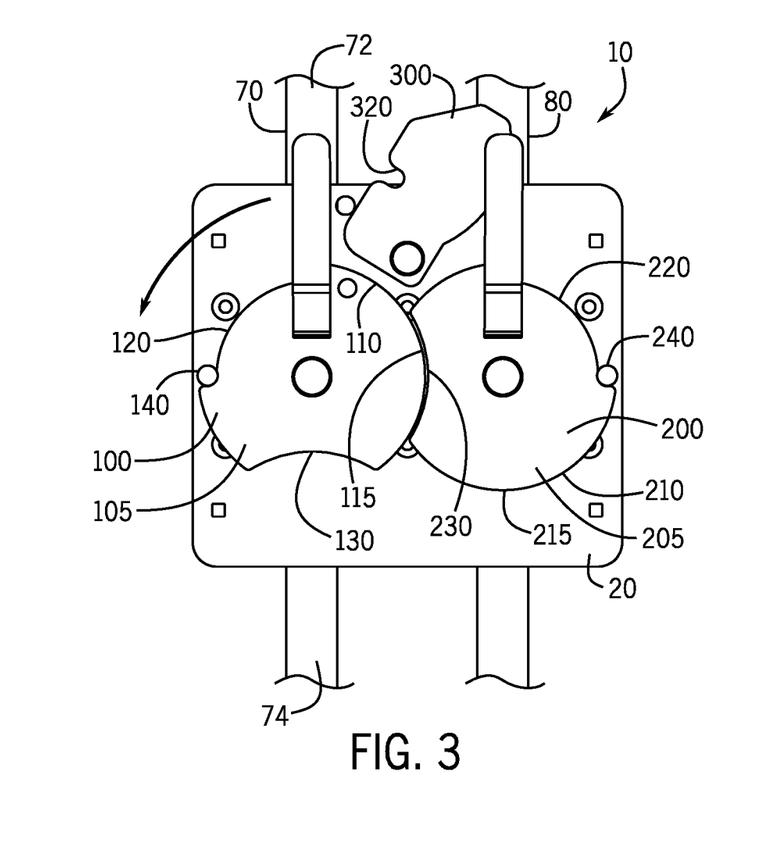
FIG. 3 is a front view of the multiple valve control assembly with both the first and second valves open.
Figure 4:
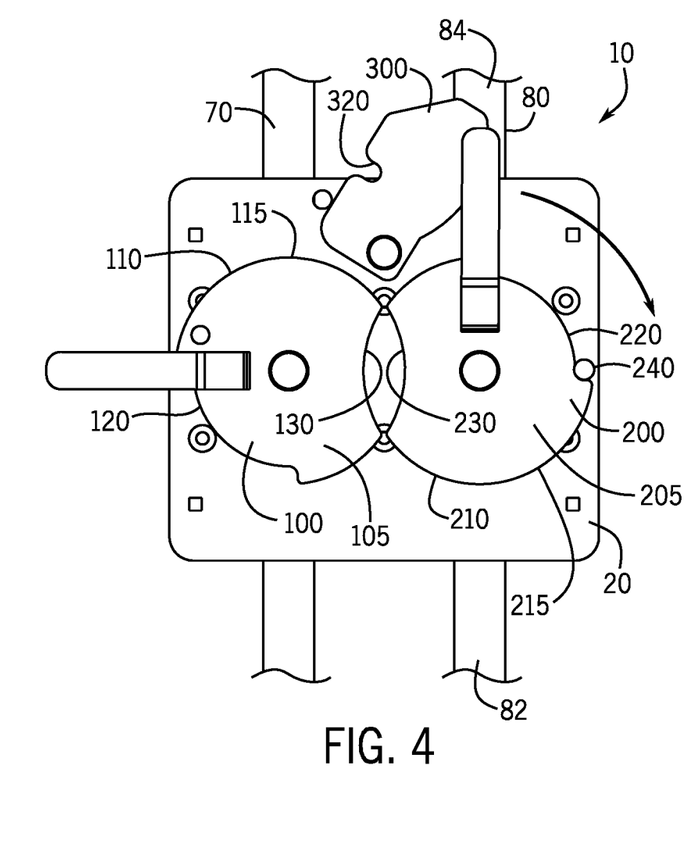
FIG. 4 is a front view of the multiple valve control assembly with the first valve closed and the second valve open.
Figure 5:
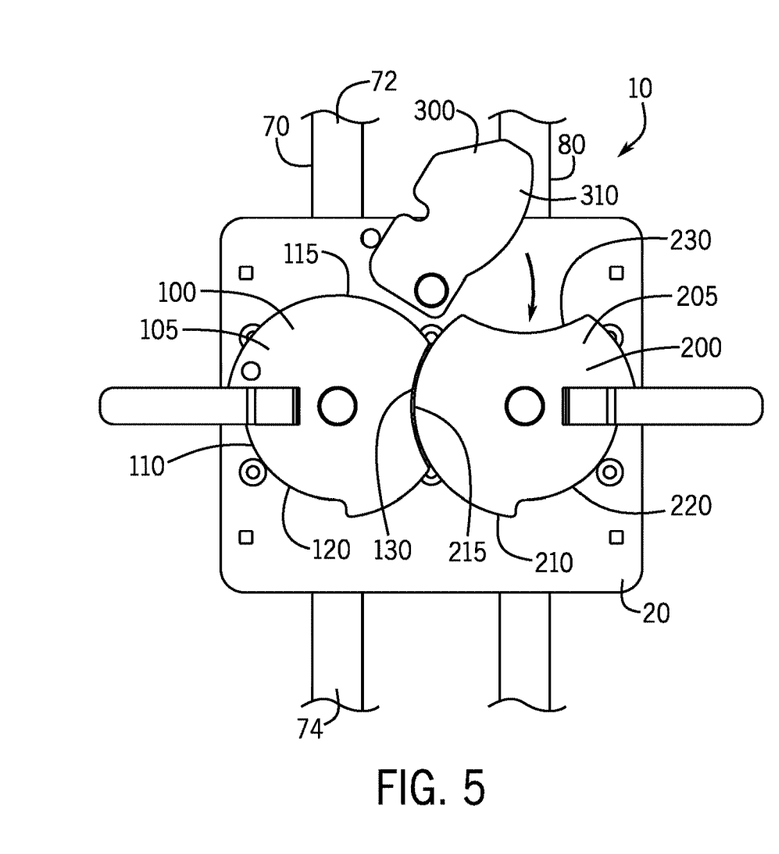
FIG. 5 is a front view of the multiple valve control assembly with both the first and second valves closed and the lock moving to the locking position.
Figure 6:
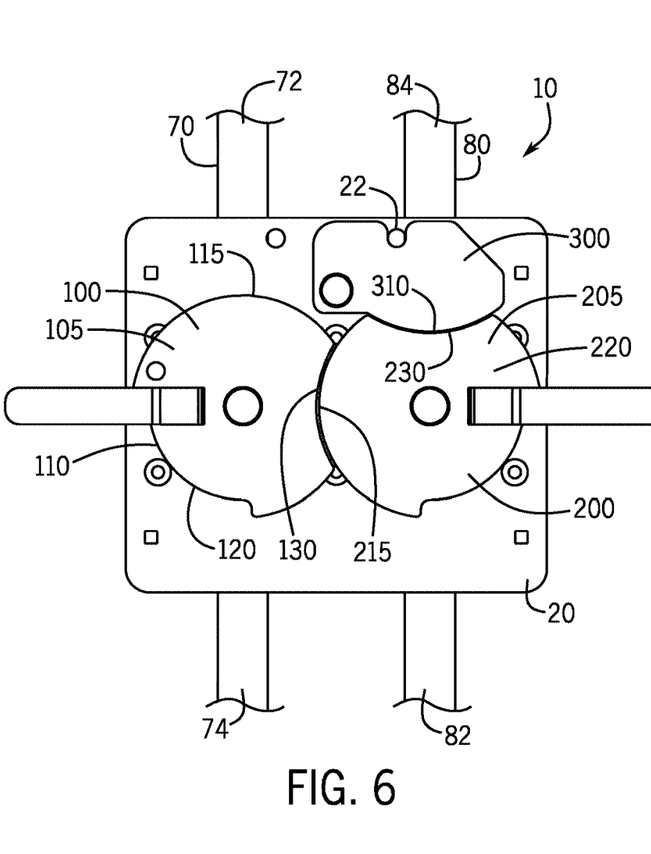
FIG. 6 is a front view of the multiple valve control assembly with both the first and second valves closed and the lock in the locking position.
Figure 7:
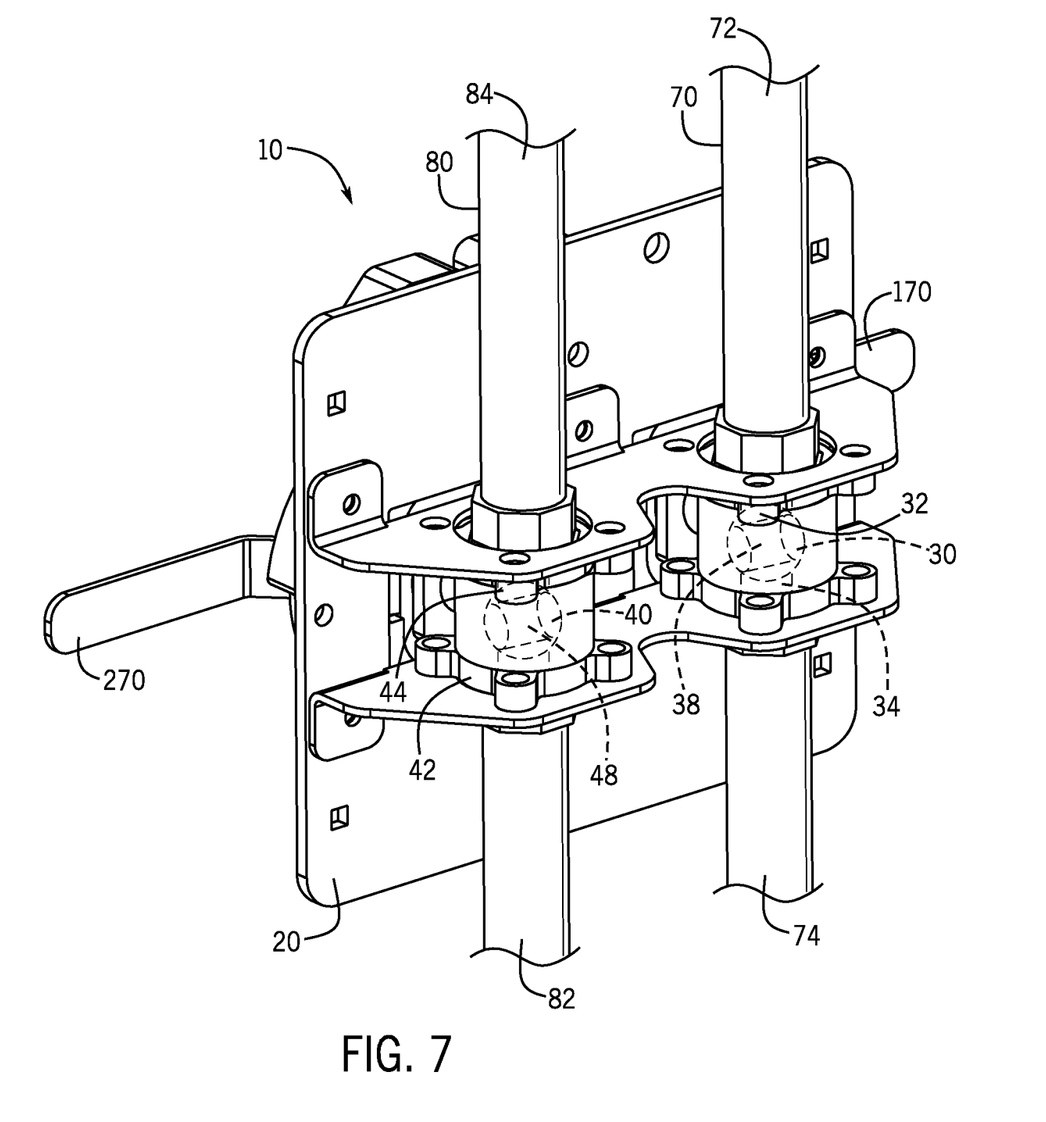
FIG. 7 is a rear view of the multiple valve control assembly.

The operation of the multiple valve control assembly 10 will now be described. FIG. 3 is a front view of the multiple valve control assembly 10 with both the first and second valves 30, 40 in the open position. The lock 300 has been rotated away from the second cam 205. The first locking surface 115 of the first cam 105 fits into the second concave surface 230 of the second cam 205—and prevents the second cam 205 from rotating. In FIG. 4, the first cam 105 has been rotated and the first valve 30 has been closed, with the second valve 40 still open. The first locking surface 115 of the first cam 105 has been rotated away from the second concave surface 230 of the second cam 200, and the first concave surface 130 of the first cam 105 is adjacent the second cam 205. In FIG. 5, the second valve 40 and the second cam 205 are now closed—and the second locking surface 215 of the second cam 205 is in the first concave surface 130 of the first cam 105. In FIG. 6, both the first and second valves 30, 40 are closed and the lock 300 is in the locking position in the second concave surface 230 of the second cam 205. As such, the second concave surface 230 may alternatingly or serially receive the convex surface 310 of the lock 300 and the first locking surface 115, and thus has a dual purpose.

The multiple valve control assembly 10 may include any of variety of valves. For example, the first valve 30 and the second valve 40 may include ball valves, butterfly valves, tapered plug valves, etc. For example, the first valve 30 and the second valve 40 may include 90 degree turn valves and other valves with a rotatable actuator.

As described above, the first valve 30 includes the first entry port 32 and the first exit port 34, while the second valve 40 includes the second entry port 42 and the second exit port 44. Socket weld connections may be used on the supply side or on the use side of the first valve 30 and the second valve 40 along with socket weld pipe, socket weld tubing, socket weld British pipe, socket weld metric tubing, etc. Threaded connections may be used on the supply side or the use side of the first valve 30 and the second valve 40. Suitable threaded connections include, for example, NPT threads—USA, SAE threads—USA, BSPP threads—worldwide, BSPT threads—worldwide, GAZ threads—France, JIS threads—Japan, Metric threads—worldwide. Quick connect style connections, such as Press-Lok®, may also be used.

The first valve 30 and the second valve 40 may be removed from the multiple valve control assembly 10 and replaced with different valves. The first valve 30 and the second valve 40 may disconnected from the pressure line 70 and the tank line 80 without disturbing the pressure line 70 and the tank line 80 from the support member 20.

Figure 8:
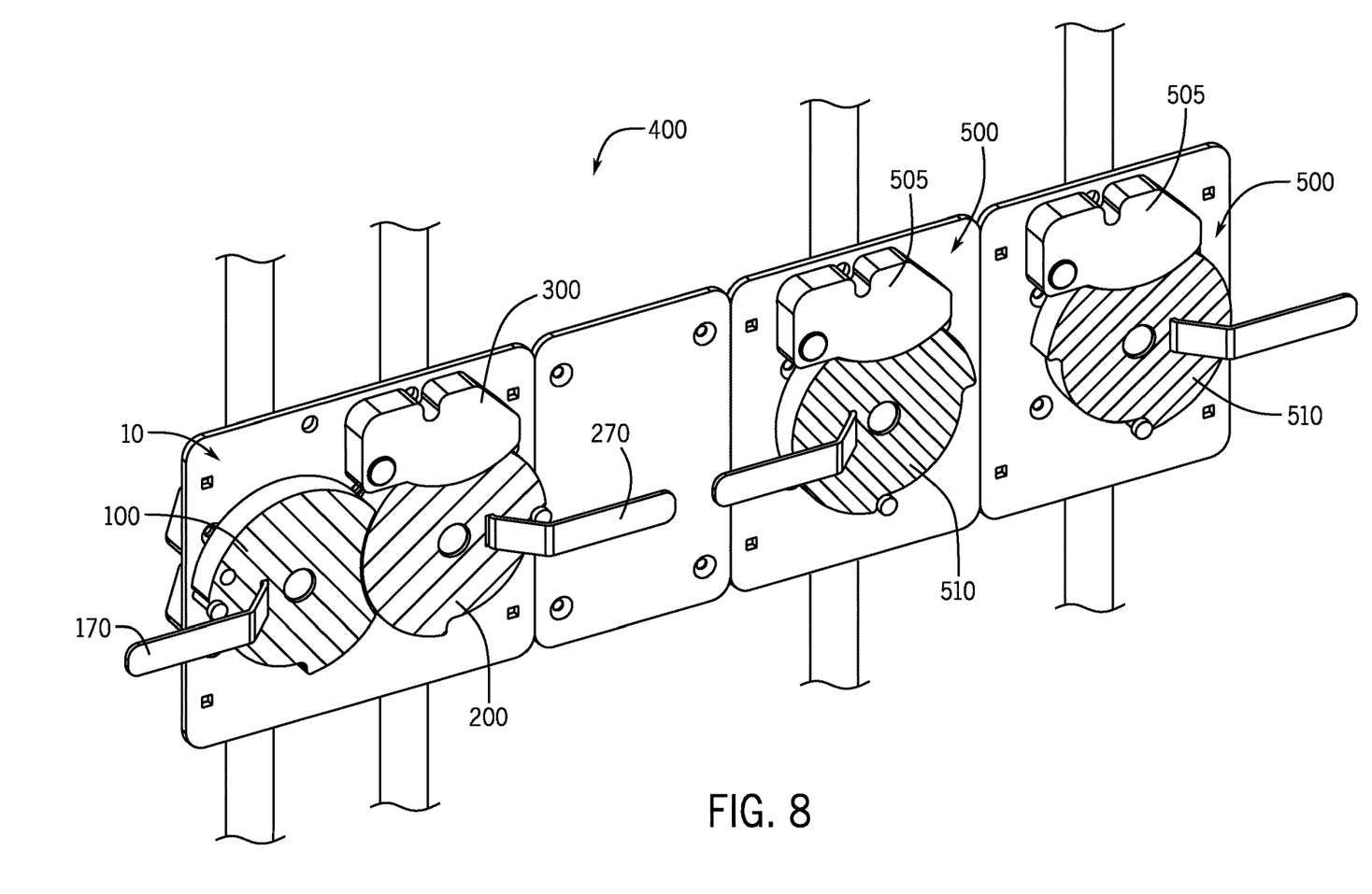
FIG. 8 is a perspective view of the system incorporating the multiple valve control assembly.

FIG. 8 is a perspective view of a system 400 incorporating the multiple valve control assembly 10 and a valve control assembly 500. Each of the cams may be color-coded for easy recognition of the particular fluid line controlled by the particular cam. For example, a black cam may be used to control a hydraulic fluid line. A blue cam may be used to control an air line. A green cam may be used to control a water line. A light blue cam may be used to control a caustic fluid line. An orange cam may be used to control an acid line. The system 400 positions all of the various controls and valves into one housing or location. The system 400 provides easy identifications for the various controls and fluids line.

Figure 9:
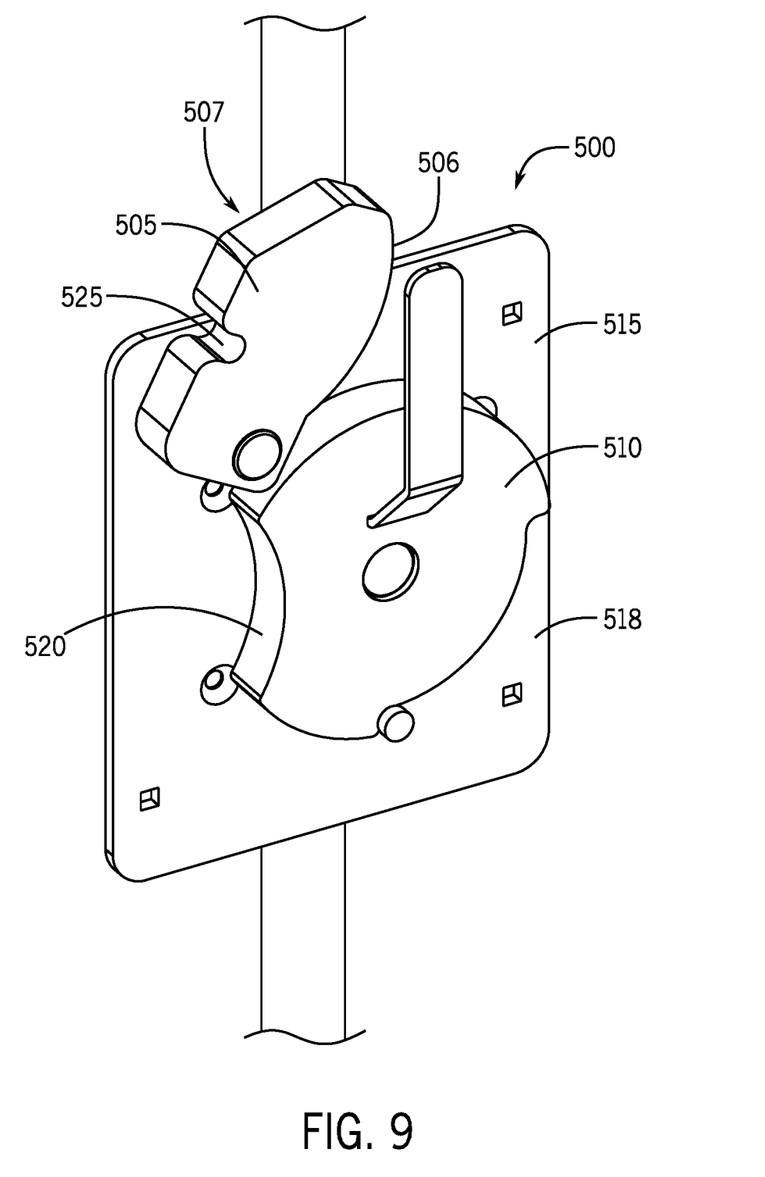
FIG. 9 is a perspective view of the valve control assembly in the open position.
Figure 10:
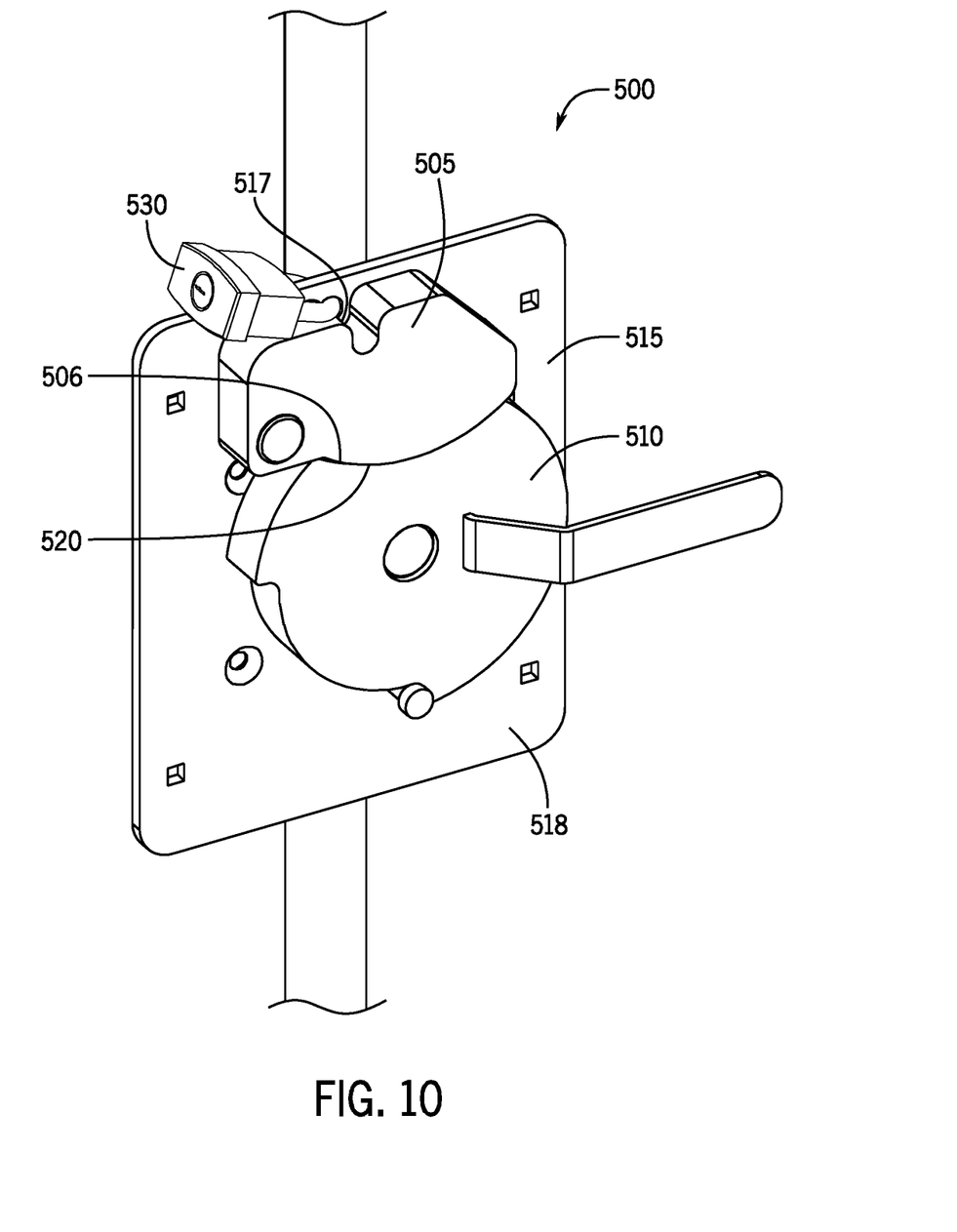
FIG. 10 is a perspective view of the valve control assembly in the closed position.

FIG. 9 is a perspective view of the valve control assembly 500 in the open position. FIG. 10 is a perspective view of the valve control assembly 500 in the closed position. The cam/lever assembly 510 rotates to open and close a valve (not shown). A lock 505 rotates between locked and unlocked positions with respect to a cam/lever assembly 510. This lock 505 may be used to lock the valve in a closed position. The lock 505 may be pivotally or rotatably attached to a support member 515. The lock 505 includes a convex surface 506 that extends into a concave segment 520 of a cam/lever assembly 510. The convex surface 506 is formed in a perimeter of the lock 505. The concave segment 520 includes a curved, concaved portion into an outer perimeter of the cam/lever assembly 510. A bottom surface 507 of the lock 505 may glide over an upper surface 518 of the support member 515.

The lock 505 includes a lock indent 525, and the support member 515 includes a lock opening 517. The lock indent 525 may be on an opposite side of the lock 505 as the convex surface 506. A secondary lock 530, such as a pad-lock may pass through the lock indent 525 and the lock opening 517 to prevent the rotation of the cam/lever assembly 510. The secondary lock 530 prevents the lock 505 from rotating to the unlocked position. As shown in FIG. 10, the lock 505 prevents the cam/lever assembly 510 from rotating.

In other aspects, the levers 170 and 270 may be removed from the cam/lever assemblies 100 and 200 and replaced with knurls or finger indentations on the outer diameter of the cams 105 and 205 to enable the operator to grip the cams 105 and 205 to rotate the cams 105 and 205 to open and closes the valves. In other aspects, the upper surface of the cams 105 and 205 includes a knob, handle, or other raised feature for the operator to grip to rotate the cams 105 and 205 to open and close the valves.

Figure 11:
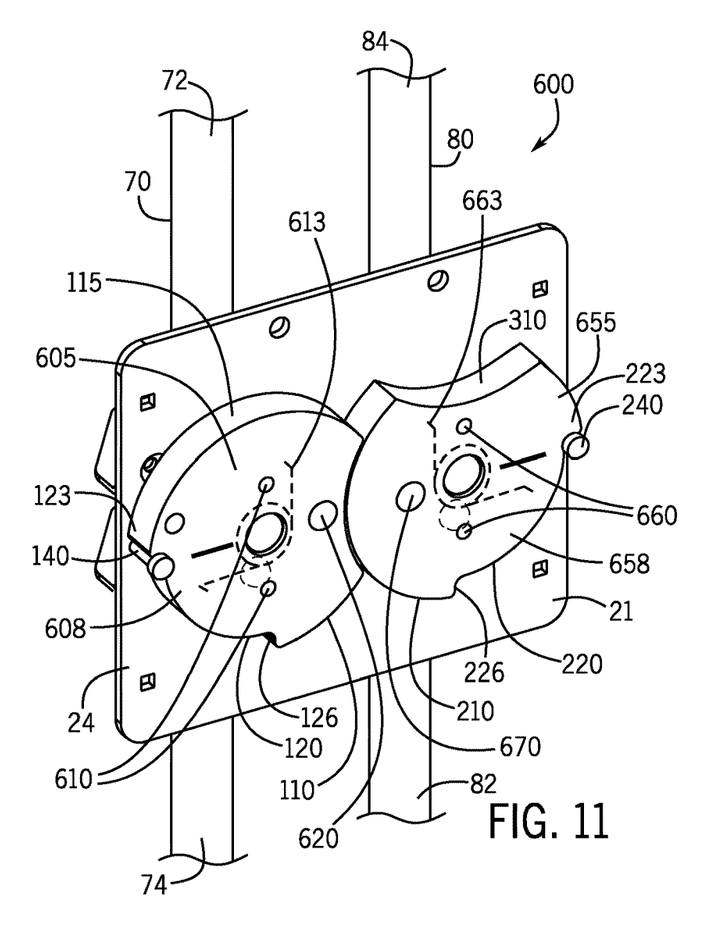
FIG. 11 is a perspective view of the multiple valve control assembly without the levers.
Figure 12:
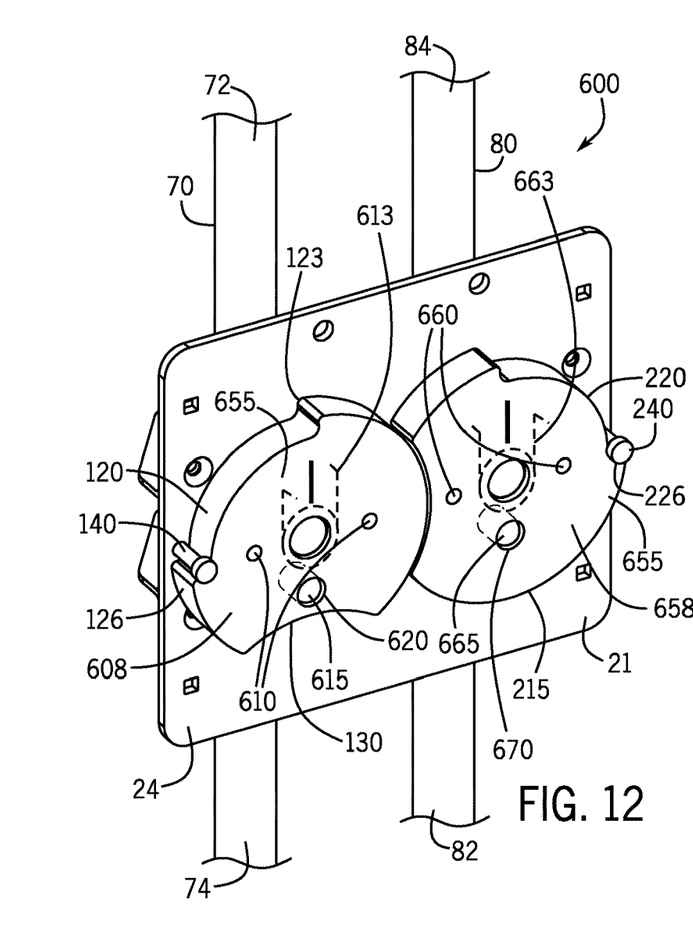
FIG. 12 is a perspective view of the multiple valve control assembly without the levers.

In other aspects, a multiple valve control assembly 600 is shown in FIGS. 11 and 12. In this aspect, first and second cams 605 and 655 do not have levers for turning the cams 605 and 655 to open and close a first valve and a second valve (not shown). Instead, upper surfaces 608 and 658 of the cams 605 and 655 include one more tool receiving points or openings 610 and 660, designed to be used with a proprietary tool, such as a SPANNER wrench. In order to turn the cams 605 and 655, ends of the proprietary tool are inserted into the one more tool receiving points or openings 610 and 660. The use of the one more tool receiving points or openings 610 and 660 may reduce unauthorized manipulation of the multiple valve control assembly 600 in an industrial setting, as the operator generally needs to have the proprietary tool in order to manipulate the cams 605 and 655. Although the use of tool receiving points 610 and 660 configured to operate with a SPANNER wrench are herein described, other proprietary or custom tools and design for the receiving points 610 and 660 may be utilized.

In other aspects, as also shown in FIGS. 11 and 12, the cams 605 and 655 may be spring loaded and biased in the closed direction, but configured to be held open. For example, a rear surface of the cams 605 and 655 may be undercut to contain a torsion spring 613, 663 with sufficient strength to turn the cams 605 and 655 and to close the first and second valves. A spring load button 615, 665, such as a mushroom button, may pass through an opening 620, 670 of the cams 605 and 655 and hold the cams 605 and 655 in the open position. The spring loaded button 615, 665 may be engaged to a support 21 and penetrate into the openings 620, 670 of the cams 605 and 655. If an operator wishes to close the valve, the operator depresses the button 615, 665 (toward the support 21) until the opening 620, 670 of the respective cam 605 and 655 is freed from the button 615, 665, and the cam 605 and 655 rotates via biasing from the torsion spring 613, 663 to the closed position. This provides for any operator to close the first and second valves, but only allows for an operator with the proprietary tool to open the first and second valves. This may help reduce unauthorized opening of the valves in an industrial setting, but provides for anyone to close the valves.

What is claimed is:

1. A multiple valve control assembly, comprising:
a support member;
a first valve, comprising:
a first entry port;
a first exit port;
a second valve, comprising:
a second entry port;
a second exit port;
a first cam engaged to the first valve to open and close the first valve, the first cam comprising a first peripheral surface having a first locking surface and a first concave surface;
a second cam engaged to the second valve to open and close the second valve, the second cam comprising a second peripheral surface having a second locking surface and a second concave surface;
the first cam configured to rotate between an open position and a closed position, the second cam configured to rotate between an open position and a closed position, wherein the first locking surface of the first cam, in the open position, prevents the rotation of the second cam; and,
wherein a lock is rotatably engaged to the support member, and the lock rotates between locked and unlocked positions.

2. The multiple valve control assembly according to claim 1, wherein the first locking surface of the first cam, when the first cam is in the open position, physically blocks the rotation of the second cam.

3. The multiple valve control assembly according to claim 1, wherein the first locking surface of the first cam, when the first cam is in the open position, fits into the second concave surface of the second cam.

4. The multiple valve control assembly according to claim 1, wherein the second concave surface of the second cam receives the first locking surface of the first cam when the first cam and the second cam are in the open positions.

5. The multiple valve control assembly according to claim 1, where a first limit extends from a surface of the support member, and the first limit is adjacent to a first convex segment of the first cam, the first convex segment includes a first end and a second end, and the first cam is configured to rotate until either the first end or the second end contacts the first limit, and wherein a second limit extends from a surface of the support member, and the second limit is adjacent to a second convex segment of the second cam, the second convex segment includes first end and a second end, and the second cam is configured to rotate until either the first end or the second end contacts the second limit.

6. The multiple valve control assembly according to claim 1, wherein the first cam must be rotated to the closed position before the second cam is rotated to the closed position.

7. The multiple valve control assembly according to claim 1, wherein the lock includes a convex surface that extends into the second concave surface of the second cam.

8. The multiple valve control assembly according to claim 1, wherein the lock includes a lock indent, and the support member includes a lock opening, and a secondary lock passes through the lock indent and the lock opening to prevent the rotation of the second cam.

9. The multiple valve control assembly according to claim 1, wherein the first or the second cams are biased in a closed direction, and a spring-loaded button is configured to hold the first or the second cam in an open position.

10. A valve system comprising the multiple valve control assembly according to claim 1, and further comprising an additional valve control assembly comprising a third cam.

11. The valve system according to claim 10, wherein the first cam, the second cam, and the third cam are color coded to match a type of fluid.

12. The valve system according to claim 10, wherein the additional valve control assembly comprises an additional support member, and the additional support member is adjacent the support member.

13. A multiple valve control assembly, comprising:
a support member;
a first valve, comprising:
a first entry port;
a first exit port;
a second valve, comprising:
a second entry port;
a second exit port;
a first cam engaged to the first valve to open and close the first valve, the first cam comprising a first peripheral surface having a first locking surface and a first concave surface;
a second cam engaged to the second valve to open and close the second valve, the second cam comprising a second peripheral surface having a second locking surface and a second concave surface;
the first cam configured to rotate between an open position and a closed position, the second cam configured to rotate between an open position and a closed position, wherein the first locking surface of the first cam, in the open position, prevents the rotation of the second cam, and
wherein the first and second cams are color coded to match a type of fluid.

14. A multiple valve control assembly for a fluidic system, comprising:
a support member;
a first valve in a first fluid line;
a second valve in a second fluid line;
a first cam rotatably engaged to the support member, the first cam engaged to the first valve to open and close the first valve, the first cam comprising a first peripheral surface having a first locking surface and a first concave surface;

a second cam rotatably engaged to the support member, the second cam engaged to the second valve to open and close the second valve, the second cam comprising a second peripheral surface having a second locking surface and a second concave surface; and, the first cam configured to rotate between an open position and a closed position, the second cam configured to rotate between an open position and a closed position, wherein the first locking surface of the first cam, in the open position, prevents the rotation of the second cam, and, when the first cam is in the closed position, the first concave surface receives the second locking surface of the second cam; and wherein the first cam and the second cam include one or more tool receiving points, one or more tool openings, knurls, indentations, knobs, handles, or other raised surface for an operator to grip to rotate the first and second cams.

15. The multiple valve control assembly for a fluidic system according to claim 14, wherein upper surfaces of the first cam and the second cam includes the one or more tool receiving points or the one or more tool openings.

16. A valve control assembly, comprising:
a valve;
a cam engaged to the valve to open and close the valve;
the cam comprising a peripheral surface having a locking surface and a concave surface;
a support member; and,
a lock is rotatably engaged to the support member, and the lock rotates between locked and unlocked positions; and
the lock includes a lock indent, and the support member includes a lock opening, and a secondary lock is configured to pass through the lock indent and the lock opening to prevent the rotation of the cam.

17. The valve control assembly according to claim 16, wherein the lock includes a convex surface that extends into the concave surface of the cam.

18. A valve control assembly, comprising:
a valve;
a cam engaged to the valve to open and close the valve;
the cam comprising a peripheral surface having a locking surface and a concave surface;
a support member; and,
a lock is rotatably engaged to the support member, and the lock rotates between locked and unlocked positions, wherein the lock includes a convex surface that extends into the concave surface of the cam to prevent rotation of the cam when the lock is in the locked position; and, wherein the cam is color coded to match a type of fluid.

19. The valve control assembly according to claim 18, wherein a spring-loaded button is configured to hold the cam in an open position.

* * * * *